Jan. 13, 1942.  C. LE BLEU  2,269,775
SCRAPER
Filed April 24, 1939  2 Sheets—Sheet 1

INVENTOR
Charles Le Bleu

Jan. 13, 1942.　　　C. LE BLEU　　　2,269,775
SCRAPER
Filed April 24, 1939　　　2 Sheets-Sheet 2
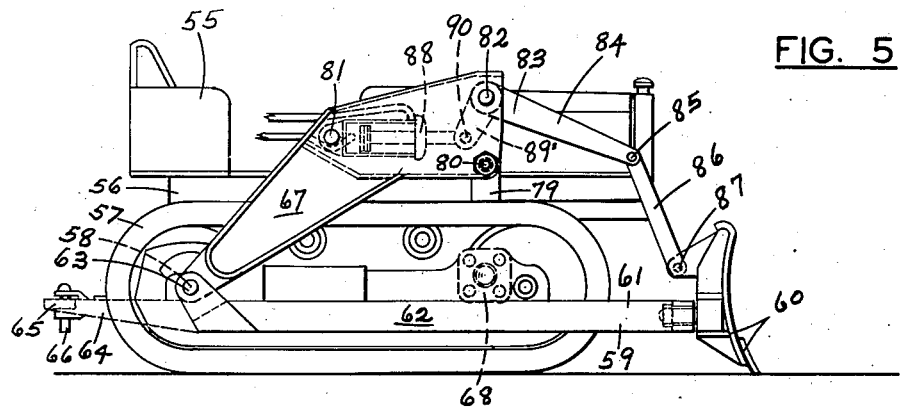

Patented Jan. 13, 1942

2,269,775

UNITED STATES PATENT OFFICE 2,269,775

SCRAPER

Charles Le Bleu, Los Angeles, Calif.

Application April 24, 1939, Serial No. 269,570

15 Claims. (Cl. 37—144)

This invention relates to apparatus for moving materials such as earth, snow, and the like, and pertains particularly to machines commonly termed trailbuilders, bulldozers, snow plows and the like, and is a continuation in part of my prior Patent No. 2,160,596.

In digging and moving earth, snow, and the like, and in spreading and grading such materials, it is common practice to use a tractor propelled implement having a substantially horizontally disposed scraper extending transversely of and in advance of the tractor, said scraper being attached to the tractor in such a manner as to be readily manipulated relative thereto and thus be caused to assume the desired working relation relative to the surface to be treated. Broadly speaking, it is common practice to connect the implement to the tractor at two points: namely, a pushing connection by means of which the pushing force of the tractor is applied to the implement, and a control connection removed from said pushing connection and including operable means whereby the implement may be adjusted relative to the tractor and the ground.

The type of tractor most widely used for pushing the class of implements above referred to includes, a body and ground engaging tread elements disposed one at each of the opposite sides of the body and journaled thereon for independent relative swinging movement. That is, each tread element may swing independently of the other about a common axis.

It is now more or less the practice to locate the pushing connection above referred to adjacent the rear end of the implement and to mount the control mechanism on the tread elements and apply the same to the implement at a point spaced forwardly from said pushing connection.

Again generally speaking, the control connection includes operable control means supported upon the tread elements by means of a control supporting structure carried thereby, and other suitable structure connects said control means with said implement. The objection to this simple structure resides in the fact that since the tread elements may swing independent of each other as they travel over uneven surfaces, the scraper will not, in operation, remain in a set position but will in fact be tilted transversely of the line of travel first in one direction and then the other and tends to cause the scraper to duplicate the uneven surface over which the tread elements travel instead of converting said uneven surface into an even surface. This objection has led to the use of some sort of compensating mechanism interposed in series with said control means between the control supporting structure carried by the tread elements, and the implement, the compensating mechanism together with the power device thus comprising the connection between the supporting structures and the implement. The disadvantage of these compensating devices, of which there are several, resides in the fact that the control means can only be utilized for raising and lowering the implement since the compensating devices now in use would neutralize the operation of the control means in opposite directions in an attempt to tilt the scraper transversely of the line of travel.

In each of my Patents 2,100,445 and 2,160,596, I disclose an arrangement of a plurality of control devices adapted to be applied to implements of the class herein named for raising and lowering and tilting the scraper, but compensating devices now in use would, if combined with the controls shown, neutralize the tilting action. This is so because the compensating devices now used are interposed between the control supporting structure and the implement.

Therefore, the principal object of this invention is the provision in a device of the class described, the combination including, a tractor having a body and a pair of tread elements disposed one at each of the opposite sides thereof and journaled behind their front ends to the body for relative swinging movement, a control support for each of said tread elements, and means mounting said control supports on said tread elements so as to maintain said supports substantially in a common plane in any position of each of said tread elements about its pivotal mounting.

Other objects and advantages of this invention will be apparent to those skilled in the art upon a detailed perusal of these specifications and the attached drawings wherein I have exemplified and described my invention, but it is to be understood that my invention as herein exemplified is susceptible to numerous changes and modifications in the co-relation and construction of parts, members and features without departing from the spirit of the invention as defined in the annexed claims.

In the drawings:

Figure 5 is a side view in elevation of a modified form of my invention.

Figure 6 is a front view in elevation partly in section, of the modified form.

Figure 7 exemplifies the yoke of the modified form, detached from the tractor, and upon which the forward end of the control supports are normally mounted.

Figure 8 exemplifies the telescoping beam, of the modified form, detached from the tractor and upon which the yoke of the modified form is normally supported.

Figure 1:
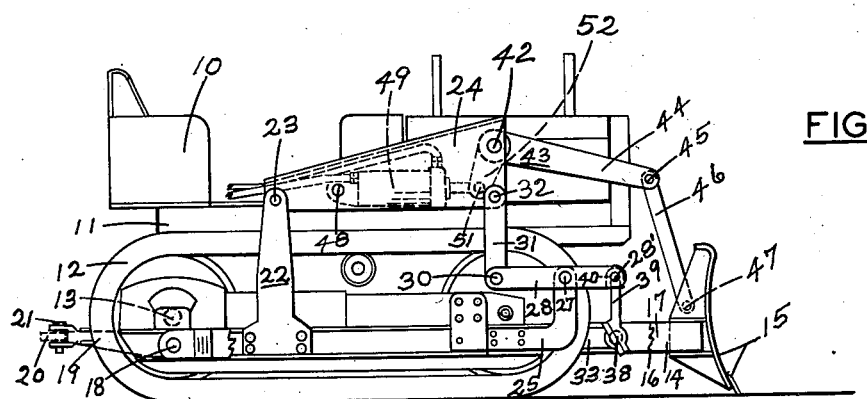
Figure 1 is a fragmentray side view in elevation of my invention.
Figure 2:
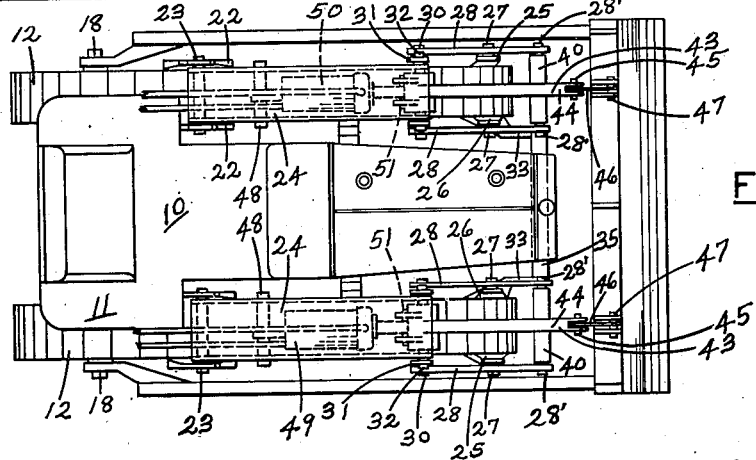
Figure 2 is a top plan view of my invention.
Figures 3, 4:
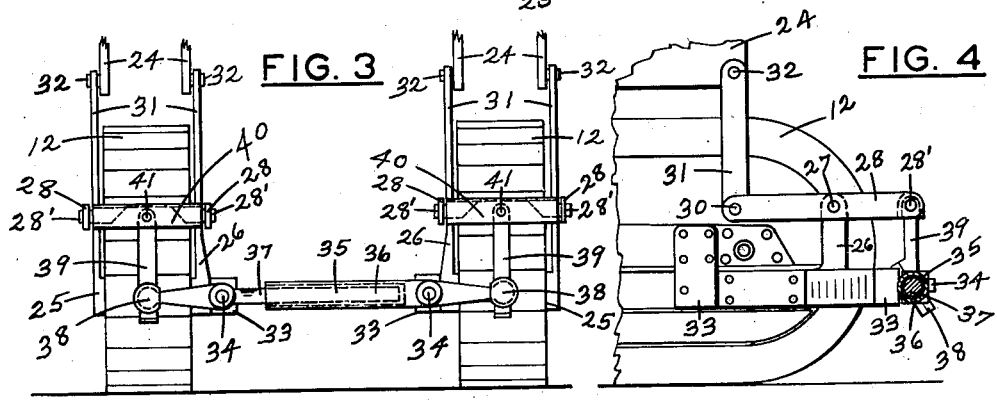
Figure 3 is a fragmentary front view in elevation.
Figure 4 is a fragmentary side view in elevation of the inside or confronting face of the forward portion of a tread element.

Referring now more specifically to structure by alluding to characters of reference on the drawings, and for the moment, particularly to Figures 1 to 4 inclusive, a tractor 10 includes a body 11 and a pair of tread elements 12 disposed one at each of the opposite sides of the body and journaled thereto about a common axis 13 so that each may have a movement independent of the other as the tread elements move across an uneven surface.

An earth moving implement 14, which may be of any suitable design, is disposed with the tractor and as exemplified in the drawings comprises a scraper 15 disposed transversely of the line of travel forwardly of the tractor and is attached to a pusher frame 16 which includes a pair of rearwardly extending pusher arms 17 disposed one along each side of the tractor. The rear ends of pusher arms 17 are connected with the tractor for swinging movement about a horizontal axis 18. However, as indicated in broken lines 19, the pusher arms 17, instead of being connected to the tractor at 18, may extend rearwardly to a connection with a transverse beam 20 secured intermediate its ends to the tractor at 21.

A pair of upstanding brackets 22 are secured at their lower ends each to a tread element 12 and are provided at their upper ends each with a horizontal pin 23. A pair of control supports 24 are disposed one above each tread element and pivotally mounted at their rear end upon pins 23. Each of said tread elements are provided at their forward ends with an outer bracket 25 and an inner bracket 26, the four brackets 25 and 26 each being provided at their upper ends with horizontal trunnions 27. Each of the horizontal trunnions 27 pivotally supports a rocker arm 28. Each of the rocker arms 28 are provided with a horizontal pin 30. Each of the pins 30 pivotally support a link 31, and links 31 are pivotally connected at their upper ends as indicated at 32, with the forward ends of control supports 24.

Each of said tread elements is provided with a forwardly extending bracket 33 having a horizontal trunnion 34 formed on the forward end thereof.

A telescoping beam 35 comprises a female section 36, and a male section 37 turnably and slidably mounted within the female section. Each of said sections being pivotally supported intermediate its ends upon a trunnion 34, the outer end of each section being connected by means of a ball and socket arrangement 38, each to one of a pair of links 39. A pair of horizontal bars 40 are disposed one adjacent the forward end of each tread element and pivotally mounted at each of their opposite ends upon the front ends of adjacent rocker arms 28, at 28', links 39 being pivotally connected at their upper ends each to the intermediate portion of an adjacent horizontal bar 40, as shown at 41.

Each of beams 24 are provided with a pin 42 upon each of which a bell crank 43 is pivotally mounted, the forward portions 44 of bell cranks 43 being pivotally connected at 45 with the upper ends of links 46, the lower ends of links 46 being pivotally connected at 47 with the earth-moving device.

Beams 24 are each provided with a horizontal pin 48. Hydraulic jacks 49 and 50 are mounted one upon each of the beams 24, each jack being pivotally mounted at its rear end upon a pin 48, and each being pivotally connected at its forward end at 51 with the rear portion 52 of a bell crank 42.

As an example of the operation of the various structure just described to accomplish the objects of the invention as set forth, assume the tractor to be advancing. Now let us assume that the forward end of the right hand tread element drops into a hole or depression in the ground. When this happens, trunnion 34, carried by the right hand tread element will be lowered with respect to the trunnion 34 carried by the left hand tread element, and telescoping beam 35 will be caused to rotate on trunnions 34 in a counter-clockwise direction and as beam 35 rotates on trunnions 34 the forward end of right hand control support 24 will be raised and the forward end of the left hand control support 24 will be lowered and since the mechanical value of the action thus imparted to the forward ends of control supports 24 is one half the value of the action of the tread element as it enters the depression, the net mechanical result is simply that, what would otherwise have been a tilting movement of the scraper equal to the action of the tread element has been changed to a lowering movement all along the scraper equal to one half the movement of the tread element. Thus it is seen that, notwithstanding the fact that the tread elements moved out of their normal parallel relationship as the right hand element entered the depression, the control supports 24, which are mounted upon the tread elements, remained in their normal parallel relationship, or, to use other words, the control supports, beams 24, were maintained and supported in a common plane notwithstanding the disturbed relationship of the tread elements upon which said beams are mounted. It should be apparent now that hydraulic jacks 49 and 50 could be operated in a common direction for raising and lowering the scraper, or in opposite directions for tilting the scraper, due to the fact that the compensating mechanism is interposed between the control supporting structures and the tractor instead of being interposed in the usual manner between the control supporting structures and the implement. Thus, I have provided means for mounting the control supports upon the tread elements so that said control supports are maintained substantially parallel in a common plane in any position of each of said tread elements about its pivotal mounting, and the scraper will therefore be supported in any selected parallel relationship with the horizontal axis 18 and the weight of the front end of the implement will always be disposed substantially equally on the tread elements, in any of their normal relative positions.

Referring now to Figures 5, 6, 7 and 8, a tractor 55 includes a body 56 and a pair of tread elements 57 disposed one along each side of the body and pivotally connected therewith about a common axis 58 so that each will have a movement independent of the other as they move across uneven surfaces.

An implement 59 comprises a scraper 60 disposed transversely of the line of travel and in front of the tractor, and a pusher frame 61 to which scraper 60 is attached, pusher frame 61 including pusher arms 62 extending one along each side of the tractor. A pair of horizontally disposed trunnions 63 are mounted on opposite sides of the tractor and upon each of them an adjacent pusher arm 62 is pivotally mounted so the implement 59 is thus mounted upon the tractor for swinging movement about a horizontal axis.

It is as well to point out at this time that pusher arms 62, instead of being supported on trunnions 63, may extend rearwardly, as indicated by broken lines 64, to a connection with a transversely extending member 65 connected intermediate its ends with the tractor by means of a pin 66.

Control supports 67 are disposed one with each of said tread elements and pivotally mounted at their rear lower ends upon adjacent trunnions 63.

Each of the tread elements 57 is provided on its confronting side with a ball socket 68 located at a point spaced forwardly from trunnions 63.

A telescoping beam 69, comprises a female member 70, and a male member 71 slidably and turnably mounted within female member 70, and a ball portion 72 is formed on the outer end of each of said members. It should be noted that the length of telescoping beam 69 is thus variable.

Beam 69 is disposed transversely of the line of travel beneath body 56 and is supported at its ends in ball sockets 68.

The female portion 70 of beam 69 is provided with a downwardly extending portion 73 having an elongated opening 74 therethrough.

A U frame 75 is provided with downwardly extending portions 76 having an opening 77 therethrough in register with opening 74 in beam 69, and a pin 78 passes through openings 74 and 77 so that U frame 75 is thus pivotally supported upon beam 69.

Each of the upwardly extending arms 79 of U frame 75 is provided with a horizontally projecting trunnion 80 that extends outwardly above tread elements 57 and upon which the forward ends of control supports 67 are pivotally supported for radial movement only about trunnions 80 as an axis.

Control supports 67 are each provided with horizontal pins 81 and 82 upon which controls are mounted as follows: beams 83 are disposed one with each of the supports 67 and are pivotally mounted intermediate their ends on pins 82. Portions 84 of beams 83 are pivotally connected at 85 with the upper ends of links 86, links 86 being pivotally connected at their lower ends with implement 59 at 87. Hydraulic jacks 88 and 89 are disposed one with each of said supports 67, said jacks being pivotally mounted at their rear ends upon pins 81, and pivotally connected at their forward ends with rear portions 89' of beams 83 as shown at 90.

As an example of the operation of the various structure, shown and described, to accomplish the objects of the invention as set forth, assume that during the advancing movement of the tractor the forward end of the right hand tread element raises relative to the left hand tread element, which raising movement may, for example, be caused by a large rock in the path of the right hand tread element, then it is clearly seen, better understood perhaps from viewing Figure 6, that beam 69 will tilt transversely of the line of travel in a vertical plane. But since rigid U frame 75 is pivotally supported substantially midway between the ends of beam 69 upon pin 78, this transverse tilting movement of beam 69 will not be imparted to U frame 75 upon which the front ends of supports 67 are mounted, and thus, supports 67 will be maintained in their normal parallel relationship in a common plane notwithstanding the disturbed relationship of tread elements 57 and beam 69, and the weight of the forward end of implement 59 will be equally disposed upon tread elements 57 in any relative position of said tread elements about their pivotal mounting.

It will be readily understood by those skilled in the art that hydraulic jacks 88 and 89 could be operated in a common direction for raising and lowering the scraper, and could be operated in opposite directions for tilting the scraper.

Again, it is seen that the compensating means is interposed between the control supports and the tractor instead of being interposed, as in the past, between the control supports and the implement with the resulting advantage that the controls supported by the control supports may be utilized for transversely tilting the scraper in addition to raising and lowering said scraper, and the scraper will be maintained in its selected parallel relationship to said horizontal axis and the weight thereof disposed substantially equally on said tread elements, in any position of each of said tread elements about its pivotal mounting.

Having thus described my invention, what I claim as new and useful and desire to secure by Letters Patent is:

1. In a device of the character described, a tractor including a body and a pair of tread elements disposed one at each of the opposite sides thereof and journaled upon the body for relative swinging movement upon a common axis at a point rearwardly of their front free ends, control supports carried at one end by said tractor for swinging movement relative to said tread elements and having opposite free ends, and operable means for supporting the free ends of said control support, said means being continuous from one to the other of said supports and having operative support on both of said tread elements, said operable means being arranged to function automatically in response to the relative swinging movement of said tread elements to compensate said supports in any position assumed by each of the tread elements about their pivotal mounting.

2. In a device of the character described, a tractor including a body and a pair of tread elements disposed one at each of the opposite sides thereof and journaled upon the body for independent relative swinging movement upon a common axis at a point rearwardly of their free front ends, control supports carried at one end by the tractor and disposed longitudinally of the tread elements for swinging movement relative to the tread elements and having opposite free ends, and operable means for supporting the free ends of said control support, said means being continuous from one to the other of said supports and having operative support on both of said tread elements, said operable means being arranged to function automatically in response to the relative swinging movement of said tread elements to compensate said supports in any position assumed by each of the tread elements about their pivotal mounting.

3. In a device of the character described, a tractor including a body and a pair of tread elements disposed one at each side of the body and journaled thereupon for independent swinging movement upon a common axis and at a point rearwardly of their front free ends, pivoted control supports carried by the tractor for vertical swinging movement relative to the tread elements and having free ends, articulate operable means for supporting the free ends of the control supports, said operable means being continuous from one support to the other support and being pivotally connected with each of the tread elements, said operable means being arranged to function automatically in response to relative swinging movement of the tread elements with respect to each other to produce compensation between the treads in their swinging action.

4. In a device of the character described, a tractor including a body and a pair of tread elements disposed one at each side of the tractor body and journaled upon the body for independent relative swinging movement around a common axis and a point rearwardly of their front free ends, control supports carried by said tractor for swinging movement relative to said tread elements and having free ends, said supports being disposed longitudinally of each of the tread elements and supported thereby adjacent their rear ends, and operable means for supporting the free ends of said control supports comprising a transverse beam, and means interconnecting said beam and said control supports, said operable means being arranged to function automatically in response to the relative swinging movement of said tread elements to equalize opposite movement of the tread elements from their normal position of planar alignment.

5. In a device of the character described, a tractor including a body and a pair of tread elements disposed one at each of the opposite sides thereof and journaled behind their front ends thereto for independent relative swinging movement, a control support disposed longitudinally of each of said tread elements and pivotally supported adjacent their rear ends thereon, a beam supported by both tread elements so as to tilt in response to relative swinging movement thereof, and means interconnecting said beam and said supports so as to maintain said supports substantially in a common plane during the tilting movement of said beam.

6. In a device of the character described, a tractor including a body and a pair of tread units disposed at opposite sides of the body and journaled rearwardly of their front free ends to the body for independent swinging movement upon a common axis, a pair of control supports, one associated with each of the tread units and pivoted thereto adjacent their rear ends for vertical swinging movement relative thereto, a pair of operable means, one pivoted to each of the tread units adjacent the forward ends of the tread units and being articulately connected to the supports and in planar alignment therewith, said operable units having forward free ends, and a transverse articulate connection between said forward free ends whereby the supports and operable means will act to compensate for relative swinging movement of the tread elements.

7. In a device of the character described, a tractor including a body, a pair of tread units disposed one at each side thereof and journaled upon the body for independent relative swinging movement upon a common axis and at a point rearwardly of their front free ends, and an earth-scraping device mounted on the tractor for movement relative thereto, a pair of control supports, one pivotally mounted at its rear end to each of the tread units and having free forward ends, control means connected with said supports and with said earth-scraping device, and operable means for supporting the forward ends of said control supports, said means being articulate and continuous from the forward free end of one control support to the other and pivotally mounted on each of the tread units, said operable means acting to function automatically in response to the relative swinging movement of said tread units so as to compensate relative swinging movement of the tread elements and dispose the weight of said earth-scraping device substantially equal on said tread units in any position the tread units may assume around their pivotal mounting.

8. In a device of the character described, a tractor including a body and a pair of tread elements disposed one at each of opposite sides thereof and journaled behind their front ends thereto for independent relative swinging movement, an earth scraping device mounted on the tractor for movement relative thereto, a control support pivotally disposed with each of said tread elements for independent movement with relation to each other and the tread elements and supported adjacent their rear ends for vertical movement relative thereto, operable means carried by said tread elements and supporting the forward end of said control supports, said operable means being arranged to function automatically in response to the relative swinging movement of said tread elements to maintain said supports substantially in a common plane in any position of each of said tread elements about its pivotal mounting, operable control means connected with said supports and with said earth scraping device, and means for actuating said control means to determine the position of said earth scraping device relative to the ground and the tractor.

9. In a device of the character described, a tractor including a body and a pair of tread elements disposed one at each of the opposite sides thereof and journaled behind their front ends thereto for independent relative swinging movement, an earth scraping device mounted on the tractor for movement relative thereto, a control support disposed with each of said tread elements and pivotally mounted adjacent their rear ends on said tractor, a beam supported by both tread elements so as to tilt in response to relative swinging movement thereof, means interconnecting said beam and said supports so as to maintain said supports substantially in a common plane during the tilting movement of said beam, operable control means connected with said supports and with said earth scraping device, and means for actuating said control means.

10. In a device of the character described, a tractor including a body and a pair of tread elements disposed one at each of the opposite sides thereof and journaled behind their front ends thereto for independent relative swinging movement, a control support disposed with each of said tread elements and supported for swinging movement relative thereto, a telescoping beam supported by both tread elements so as to tilt in response to the relative swinging movement thereof, and means interconnecting said beam and said control supports so as to maintain said supports substantially in a common plane during the tilting movement of said beam.

11. In a device of the character described, a tractor including a body and pair of tread elements disposed one at each of the opposite sides thereof and journaled behind their front ends thereto for independent relative swinging movement, a control support disposed with each of said tread elements and supported adjacent their rear ends for swinging movement relative thereto, a telescoping beam pivotally supported by both tread elements so as to tilt in response to the relative swinging movement thereof, and means pivotally inter-connecting said beam and said control supports so as to maintain said supports substantially in a common plane during the tilting movement of said beam.

12. In a device of the character described, a tractor including a pair of tread elements disposed one at each of the opposite sides thereof and journaled behind their front ends thereto for independent relative swinging movement, a control support disposed with each of said tread elements and mounted on the tractor for swinging movement about a horizontal axis, a beam supported on both of said tread elements so as to tilt in response to the relative swinging movement thereof, an upstanding U frame pivotally supported substantially centrally of its width on said transverse beam intermediate its ends, and means pivotally mounting the free ends of said control supports on said U frame so as to maintain the same substantially in a common plane during the tilting movement of said beam.

13. In a device of the character described, a tractor including a pair of tread elements disposed one at each of the opposite sides thereof and journaled behind their front ends thereto for independent relative swinging movement, a control support disposed with each of said tread elements and mounted on the tractor for swinging movement about a horizontal axis, a beam supported by both of said tread elements at points spaced inwardly from each of its ends, said beam being arranged to tilt in response to the relative swinging movement of said tread elements, and operable means inter-connecting each of said control supports with an adjacent end of said beam so as to maintain said supports substantially in a common plane during the tilting movement of said beam.

14. In a device of the character described, a tractor including a pair of tread elements disposed one at each of the opposite sides thereof and journaled thereto upon a common axis rearwardly of their front ends for independent relative swinging movement, a pair of control supports disposed at sides of the tractor and pivotally mounted at their rear ends upon a tread element for movement relative to said tread elements the forward ends being free, and operable compensating means continuous from the free end of one of said control supports to the free end of the other control support and supported on both tread elements, said operable compensating means being arranged to function automatically in response to the relative swinging movement of said tread elements so as to compensate for relative swinging movement of said tread elements.

15. In a device of the character described a tractor including a pair of tread elements disposed one at each of the opposite sides thereof and journaled thereto upon a common axis rearwardly of their front ends for independent relative swinging movement, an earth-working device mounted on the tractor for movement relative thereto, a pair of control supports disposed at the sides of the tractor and mounted pivotally at their rear ends upon a tread element for movement relative to said tread elements the forward ends being free, control means articulately connected with the free ends of said supports and with said earth-working device, and operable compensating means continuous from one of said control supports to the other and supported on both tread elements, said operable compensating means being arranged to function automatically in response to the relative swinging movement of said tread elements to dispose the weight of said earth-working device substantially equally on said tread elements in any position of each of them about its pivotal mounting.

CHARLES LE BLEU.